(12) United States Patent
Hikichi

(10) Patent No.: US 10,165,143 B2
(45) Date of Patent: Dec. 25, 2018

(54) INFORMATION PROCESSING APPARATUS AND METHOD OF CONTROLLING LAUNCH THEREOF

(71) Applicant: CANON KABUSHIKI KAISHA, Tokyo (JP)

(72) Inventor: Atsushi Hikichi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/099,629

(22) Filed: Apr. 15, 2016

(65) Prior Publication Data

US 2016/0234395 A1  Aug. 11, 2016

Related U.S. Application Data

(63) Continuation of application No. 13/474,910, filed on May 18, 2012, now Pat. No. 9,380,181.

(30) Foreign Application Priority Data

May 23, 2011  (JP) ................................. 2011-115144

(51) Int. Cl.
*H04N 1/00* (2006.01)
*G06F 9/4401* (2018.01)
(Continued)

(52) U.S. Cl.
CPC ......... *H04N 1/00891* (2013.01); *G06F 1/266* (2013.01); *G06F 9/442* (2013.01);
(Continued)

(58) Field of Classification Search
CPC . G06F 1/26; G06F 1/32; G06F 1/3203; G06F 1/3234; G06F 9/4401;
(Continued)

(56) References Cited

U.S. PATENT DOCUMENTS 4,907,150 A  3/1990 Arroyo et al.
5,530,879 A  6/1996 Crump et al.
(Continued)

FOREIGN PATENT DOCUMENTS

CN  101661404 A  3/2010
DE  4135812 A1  5/1992
(Continued)

OTHER PUBLICATIONS

"Advanced Configuration and Power Interface Specification", Hewlett-Packard Corporation, et al., Apr. 5, 2010, Revision 4.0a.
(Continued)

*Primary Examiner* — Ji H Bae
(74) *Attorney, Agent, or Firm* — Rossi, Kimms & McDowell LLP

(57) ABSTRACT

An information processing apparatus is capable of quick launch, in which information of memory is held and the apparatus is launched using the information, and includes an RTC that keeps the time and generates an interrupt at a set time. The apparatus detects whether or not there is an instruction to turn a power supply on or off, and if an instruction to turn the power off is detected, determines whether or not the quick launch is active. If it is determined that the quick launch is active, the apparatus sets an interrupt generated by the RTC inactive.

37 Claims, 12 Drawing Sheets

(51) Int. Cl.
*G06F 9/48* (2006.01)
*G06F 1/32* (2006.01)
*G06F 1/26* (2006.01)

(52) U.S. Cl.
CPC ....... *G06F 9/4812* (2013.01); *H04N 1/00896* (2013.01); *H04N 1/00904* (2013.01); *H04N 1/00928* (2013.01); *G06F 1/3203* (2013.01); *G06F 1/3234* (2013.01); *G06F 9/4401* (2013.01); *G06F 9/4418* (2013.01); *H04N 2201/0094* (2013.01)

(58) Field of Classification Search
CPC ...... G06F 9/4418; G06F 9/4812; G06F 1/266; G06F 9/442; H04N 1/00896; H04N 1/00904; H04N 1/00928; H04N 1/00891; H04N 2201/0094
USPC ............... 713/2, 300, 323; 710/262
See application file for complete search history.

(56) References Cited

U.S. PATENT DOCUMENTS

| | | | |
|---|---|---|---|
| 6,378,068 B1 | 4/2002 | Foster et al. | |
| 6,378,076 B1 | 4/2002 | Qureshi | |
| 6,571,343 B1 | 5/2003 | Johnson et al. | |
| RE39,837 E | 9/2007 | Marisetty | |
| 2003/0061526 A1 | 3/2003 | Hashimoto | |
| 2004/0098578 A1 | 5/2004 | Funayama | |
| 2006/0097598 A1 | 5/2006 | Lelkes et al. | |
| 2006/0253716 A1 | 11/2006 | Dhiman et al. | |
| 2007/0266264 A1 | 11/2007 | Lewites et al. | |
| 2007/0266265 A1 | 11/2007 | Zmudzinski et al. | |
| 2010/0100719 A1 | 4/2010 | Chen et al. | |

FOREIGN PATENT DOCUMENTS

| | | |
|---|---|---|
| JP | 08087362 A | 4/1996 |
| JP | 2000047536 A | 2/2000 |

OTHER PUBLICATIONS

Extended European Search Report issued in European Appln. No. 12168807.1 dated Aug. 16, 2012.
Office Action issued in Chinese Appln. No. 201210162738.9 dated Jul. 15, 2014. English translation provided.
Office Action issued in U.S. Appl. No. 13/474,910 dated Jul. 16, 2014.
Office Action issued in U.S. Appl. No. 13/474,910 dated Dec. 26, 2014.
Office Action issued in U.S. Appl. No. 13/474,910 dated Apr. 29, 2015.
Office Action issued in U.S. Appl. No. 13/474,910 dated Oct. 8, 2015.
Notice of Allowance issued in U.S. Appl. No. 13/474,910 dated Jan. 20, 2016.
Office Action issued in U.S. Appl. No. 13/474,910 dated Apr. 8, 2015.
Summons to attend oral proceedings pursuant to Rule 115(1) EPC issued in European Appln. No. 12168807.1 dated Sep. 17, 2018.

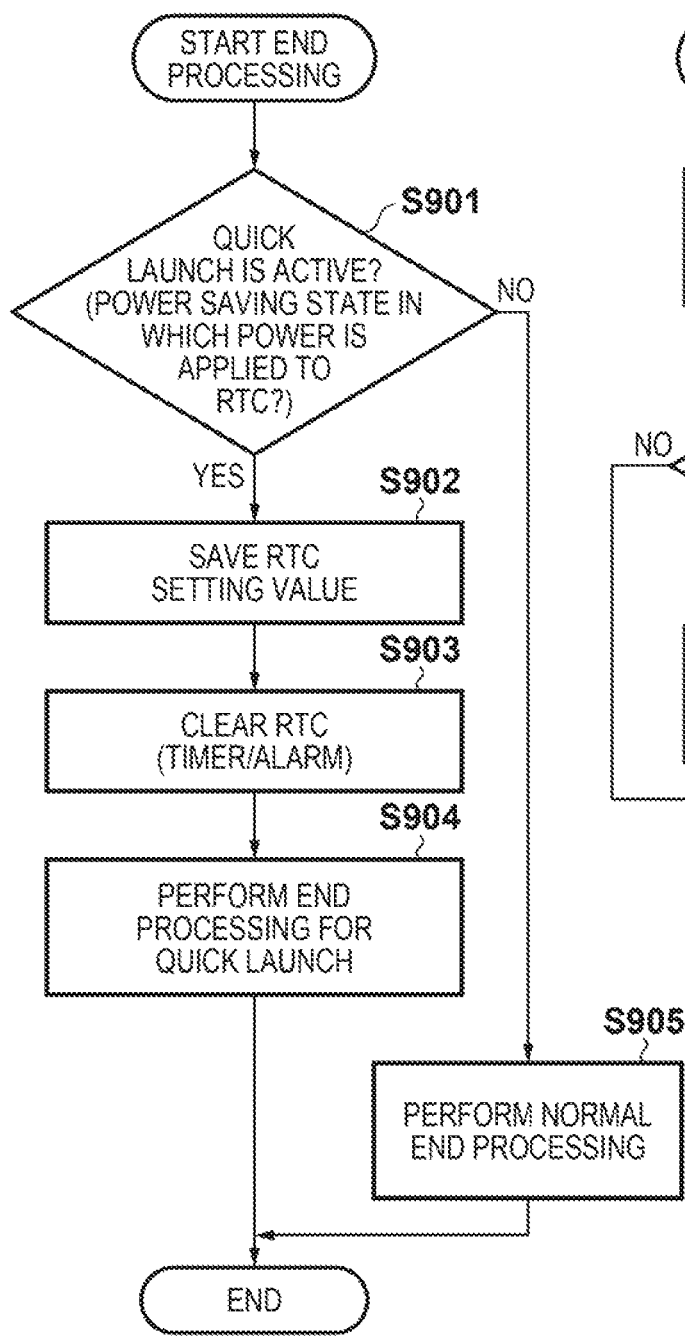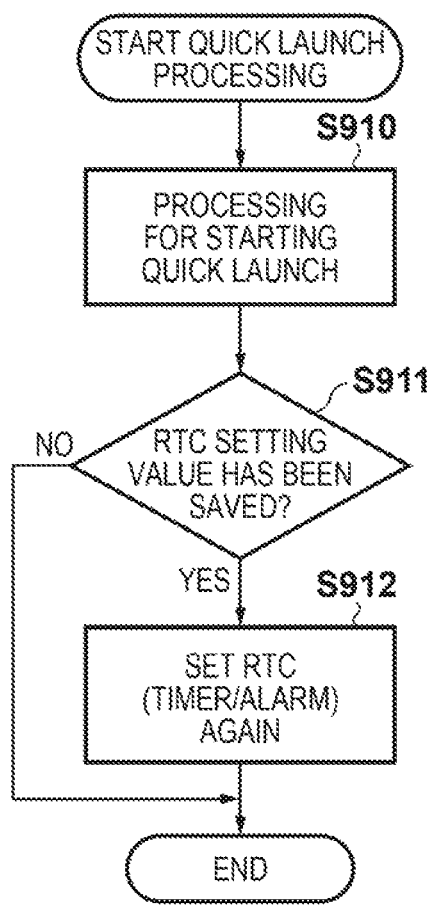
FIG. 9A
FIG. 9B

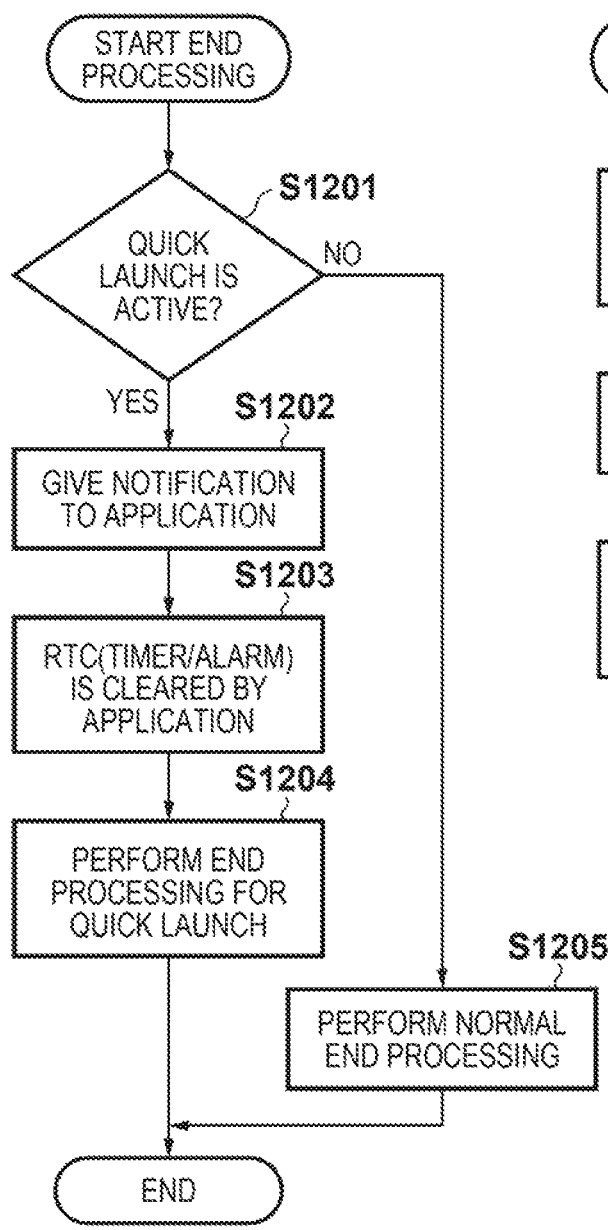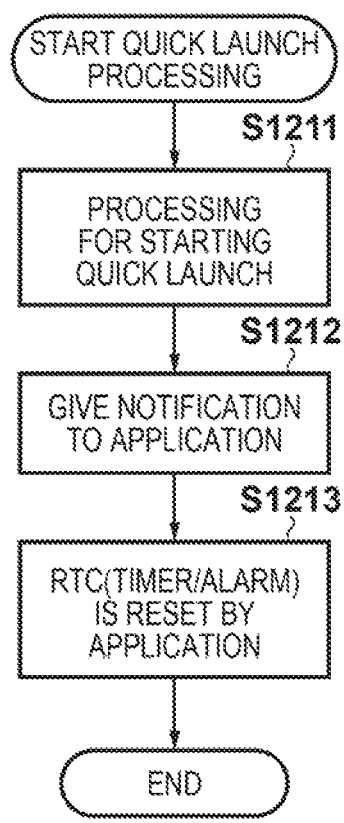

INFORMATION PROCESSING APPARATUS AND METHOD OF CONTROLLING LAUNCH THEREOF

BACKGROUND OF THE INVENTION

Field of the Invention

The present invention relates to an information processing apparatus and a method of controlling launch thereof.

Description of the Related Art

In recent years, saving the power of image forming apparatuses has been desired. For example, European implementing regulations for standby power consumption define a standby mode in which triggers such as a network, a remote switch, a built-in sensor, and a timer make the principle functionality usable, and an off mode in which even a trigger such as a network is not accepted and power consumption does not exceed 0.50 W. The regulations also make it mandatory for equipment to offer a power management function that enables automatic switching to the off or standby mode.

Increasing the functionality of image forming apparatuses has also been desired in recent years. Image forming apparatuses have been demanded to have much more functionality and enhance their performance in order to provide solutions for improving the user's work efficiency. Satisfying both of power saving and high functionality, however, raises a problem in that the launch time is increased. This is because hardware and software for controlling the hardware become complex in order to satisfy both of power saving and high functionality, and accordingly the launch time becomes longer. The launch time is an amount of time from when a power switch is turned on to when equipment becomes usable by a user after initialization of hardware and software.

As a countermeasure against such a problem of increased launch time, there is a so-called ACPI (Advanced Configuration and Power Interface)-S3 mode in which when a user has turned a power switch off, the power supply to the main storage memory is continued, and when the user has turned the power switch on, the launch speed is increased by using information stored in the main storage. Hereinafter, such a technique for increasing the launch speed using the ACPI-S3 mode is referred to as "quick launch". Furthermore, a state in which quick launch is active and end processing has been completed is referred to as "quick off". For quick launch, since information obtained by previous launch is held, the power supply to part of hardware including a real time clock (RTC) is continued even in the power off state. In this case, the RTC is active, so if an alarm is set in the RTC, equipment will revert due to RTC interrupts, despite the user intending to end the apparatus by turning the power switch off. However, because the power switch is off, the equipment will be powered off in the middle of operation after an engine and a scanner have been activated for launch. Thus, simply employing quick off results in unintended reversion due to RTC interrupts.

For example, in the technique disclosed in Japanese Patent Laid-Open No. 08-087362, when in the off or suspend state, equipment transitions to the normal state upon receiving an external event such as an alarm. Conversely, when in the normal state, the equipment transitions to the standby or suspend state in the event of timeout. Thus, if no countermeasure is taken, the equipment, when in the off state, will revert to the normal state in the event of an alarm. Furthermore, according to the definitions of the European implementing regulations for standby power consumption, the case in which quick launch is active is equivalent to the off mode in which power consumption shall not exceed 0.50 W, in which case reversion in response to an RTC timer has to be prohibited.

Meanwhile, in the technique disclosed in Japanese Patent Laid-Open No. 2000-047536 for disabling an RTC timer, a weekly timer that is used to shut down equipment at a designated time on each day of the week is disabled when using a cascade copy function in which output is distributed to a plurality of multi-function peripherals. This technique is a method for disabling a software timer during job execution.

In this way, with the conventional technology, when a user has turned the power switch off in a state in which the quick launch is active, if a time is set in the RTC, equipment is launched in response to RTC interrupts occurring.

Furthermore, at the time of normal launch, a time is set in the RTC as necessary when each module is initialized. However, at the time of quick launch, a time is not set again in the RTC if no measure is taken because previous processing that was being performed before turning the power switch off is continued.

Moreover, a case is considered in which RTC settings are cancelled before quick off, and then after quick launch, a time during quick off is set again in the RTC so as to execute an RTC interrupt. In such a case, an application that has received the RTC interrupt cannot know if the received RTC interrupt is an interrupt that has occurred during quick off or an on-time interrupt. For this reason, if a past time has been set in the RTC, an RTC interrupt will occur immediately after the setting.

Furthermore, if there are a plurality of RTC interrupts set during quick off because, for example, the quick-off period was long, a large number of interrupts will occur at the time of quick launch, and as a result, quick launch processing is stopped for a long time. Furthermore, if conditions such as whether or not to set RTC interrupts again at the time of quick launch are made selectable, the amount of time taken until the quick launch is completed increases as the number of such conditions increases.

SUMMARY OF THE INVENTION

An aspect of the present invention is to eliminate the above-mentioned problems with the conventional technology.

A feature of the present invention is to provide a technique for preventing the occurrence of interrupts during quick off.

According to an aspect of the present invention, there is provided an information processing apparatus capable of quick launch, in which information of memory is held and the apparatus is launched using the information, the apparatus comprising: a generation unit configured to generate an interrupt at a set time; a detection unit configured to detect an instruction to turn a power supply off; a determination unit configured to, if the detection unit detects an instruction to turn the power supply off, determine whether or not the quick launch is active; and a setting unit configured to, if the determination unit determines that the quick launch is active, set an interrupt generated by the generation unit inactive.

According to another aspect of the present invention, there is provided a method for controlling launch of an information processing apparatus that is capable of quick launch, in which information of memory is held and the apparatus is launched using the information, and includes an RTC that keeps the time and generates an interrupt at a set time, the method comprising: a detection step of detecting whether or not there is an instruction to turn a power supply on or off; a determination step of, if an instruction to turn the power supply off is detected in the detection step, determining whether or not the quick launch is active; and a setting step of, if it is determined in the determination step that the quick launch is active, setting an interrupt generated by the RTC inactive.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9A is a flowchart for describing end processing according to a second embodiment.

FIG. 9B is a flowchart for describing quick launch processing according to the second embodiment.

FIG. 12A is a flowchart for describing end processing according to a fifth embodiment.

FIG. 12B is a flowchart for describing quick launch processing according to the fifth embodiment.

DESCRIPTION OF THE EMBODIMENTS

Embodiments of the present invention will be described hereinafter in detail with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. While the embodiments of the present invention take image forming apparatuses as an example of an information processing apparatus according to the present invention, an apparatus or system to which the present invention is to be applied is not limited to these image forming apparatuses. Furthermore, the embodiments of the present invention describe an information processing apparatus and a launch control method thereof using the example of an image forming apparatus (information processing apparatus) capable of quick launch, in which information of memory is held and the apparatus is launched using the information.

Figure 1:
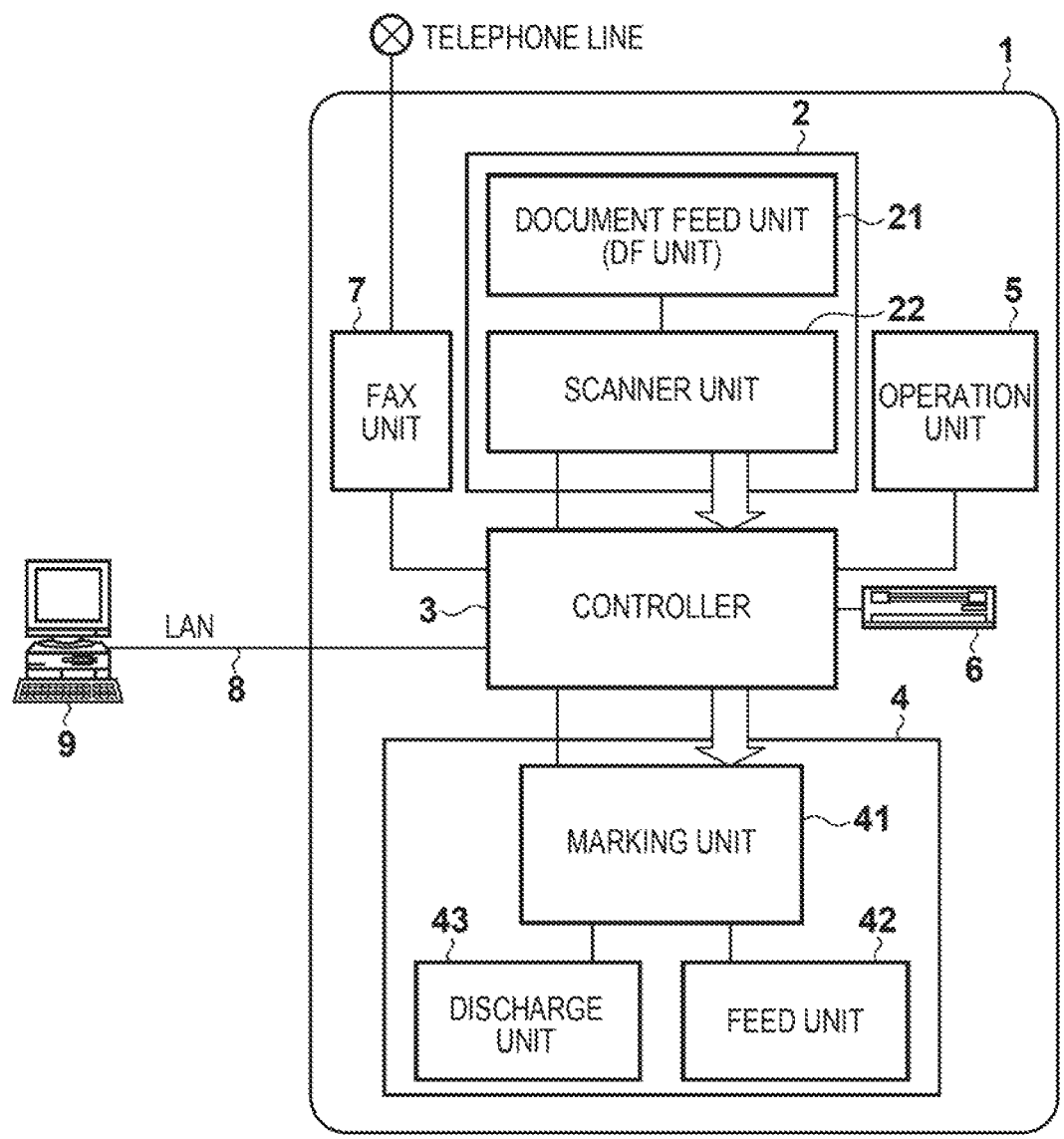
FIG. 1 is a block diagram showing a configuration of an image forming apparatus and a system configuration according to an embodiment of the present invention.

FIG. 1 is a block diagram showing a configuration of an image forming apparatus, and a system configuration including the image forming apparatus according to an embodiment of the present invention.

An image forming apparatus 1 includes a scanner 2 that optically reads an image from a document and converts the image into digital image data, and a printer unit 4 that outputs a digital image on a paper medium. The image forming apparatus 1 further includes an operation unit 5 for performing operations of the image forming apparatus 1, a hard disk (HDD) 6 that stores digital images, control programs and the like, a facsimile (FAX) unit 7 that transmits a digital image via a telephone line or the like, and a controller 3 that is connected to and controls these units. The image forming apparatus 1 is also capable of inputting/outputting digital image data to/from a computer 9 and receiving jobs and various instructions from the computer 9, via a LAN 8.

The scanner 2 includes a document feed unit 21 that feeds a document from a document bundle placed on a tray, and a scanner unit 22 that optically scans the fed document and converts an image of the scanned document into digital image data, and the converted image data is transmitted to the controller 3. The printer unit 4 includes a feed unit 42 capable of feeding paper one at a time from a plurality of sheets of paper placed on a tray, a marking unit 41 for printing image data on the fed paper, and a discharge unit 43 for discharging printed paper.

The image forming apparatus 1 is capable of executing various jobs. Examples of the jobs are listed below:

Copying function of storing image data obtained by the scanner 2 in the hard disk 6 and outputting the image data to the printer unit 4, in which the image data is printed;

Image transmission function of transmitting image data obtained by the scanner 2 to the computer 9 via the LAN 8;

Image saving function of storing image data obtained by the scanner 2 in the hard disk 6 and transmitting or printing the image data as necessary; and Image print function of analyzing, for example, print data in a page description language transmitted from the computer 9 and performing printing in accordance with the print data, using the printer unit 4.

Figure 2:
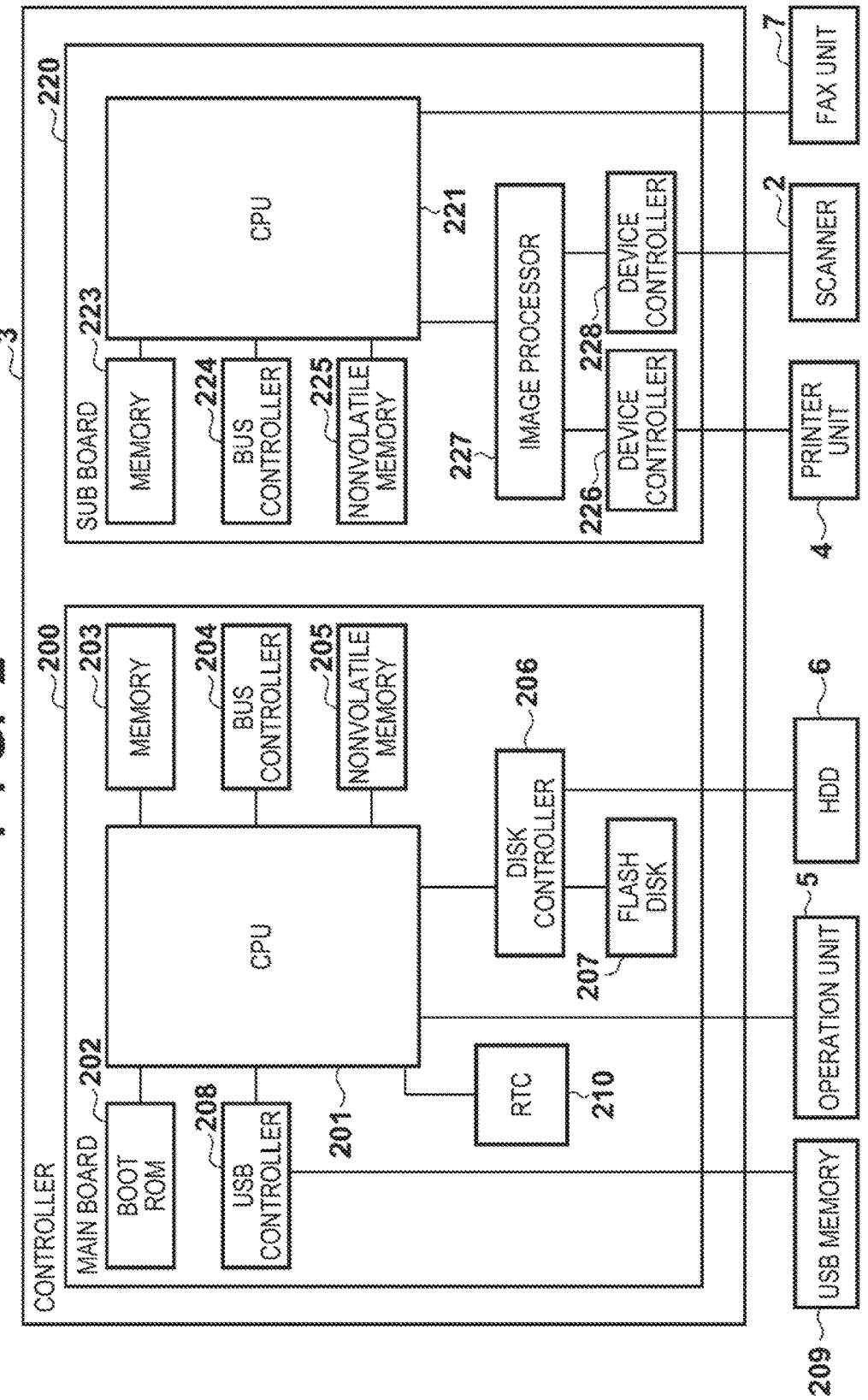
FIG. 2 is a block diagram showing a configuration of a controller according to an embodiment of the present invention.

FIG. 2 is a block diagram showing a configuration of the controller 3 according to the embodiment of the present invention.

The controller 3 is equipped with a main board 200 and a sub board 220. The main board 200 is a substrate on which a general-purpose CPU system is mounted. The main board 200 includes a CPU 201 that performs overall control, a boot ROM 202 that stores a boot program, a memory 203 that is used by the CPU 201 as a work memory, a bus controller 204 having a bridge function of connecting an external bus, and a nonvolatile memory 205. The main board 200 is further equipped with, for example, a disk controller 206 that controls a storage device (HDD), a flash disk (e.g., SSD) 207 that is a relatively small-capacity storage device configured from a semiconductor device, and a USB controller 208 that controls a universal serial bus (USB). Furthermore, a USB memory 209, the operation unit 5, the hard disk 6, and the like are connected to the main board 200. A real time clock (RTC) 210 keeps the time in accordance with instructions from the CPU 201 and performs timer processing such as generating an interrupt when a designated time period has elapsed.

The sub board 220 is equipped with a relatively small-scale general-purpose CPU system and hardware for image processing. The sub board 220 includes a CPU 221, a memory 223 that is used by the CPU 221 as a work memory, a bus controller 224 having a bridge function of connecting an external bus, and a nonvolatile memory 225. The sub board 220 further includes an image processor 227 that performs image processing in real-time, and device controllers 226 and 228. The scanner 2 and the printer unit 4 exchange digital image data with the sub board 220 via the device controllers 228 and 226, respectively. The FAX unit 7 is directly controlled by the CPU 221. Note that FIG. 2 is a simplified block diagram. Although the CPU 201, the CPU 221 and the like include a large number of hardware pieces around the CPUs, such as a chip set, a bus bridge, and a clock generator, those pieces are not the primary portion of the present invention and thus have been omitted here. Thus, the present invention is not limited to the configuration shown in this block diagram.

Now, operations performed by the controller 3 will be described taking the example of the case where an image is copied.

When an operator gives an instruction to copy an image through the operation unit 5, the CPU 201 transmits an instruction to read an image to the scanner 2 via the CPU 221. In response to this, the scanner 2 optically scans a document, converts an image of the document into digital image data, and supplies the digital image data to the image processor 227 via the device controller 228. The image processor 227 transfers processed image data by DMA to the memory 223, in which the digital image data is temporality saved.

Upon confirming that a fixed amount of or all of the digital image data has been stored in the memory 223, the CPU 201 issues an instruction to print the image to the CPU 221. The CPU 221 gives the image processor 227 the storage location of the image data in the memory 223. As a result, the image data stored in the memory 223 is transmitted to the printer unit 4 via the image processor 227 and the device controller 226 in accordance with a synchronization signal from the printer unit 4 and is printed on paper (a sheet) by the printer unit 4.

Note that in the case where a plurality of copies are to be printed, the CPU 201 saves the image data held in the memory 223 in the hard disk 6, and when printing the second and subsequent copies, transmits the image data from the hard disk 6 to the printer unit 4 and prints the image data without the image data needing to be supplied from the scanner 2.

Figure 3:
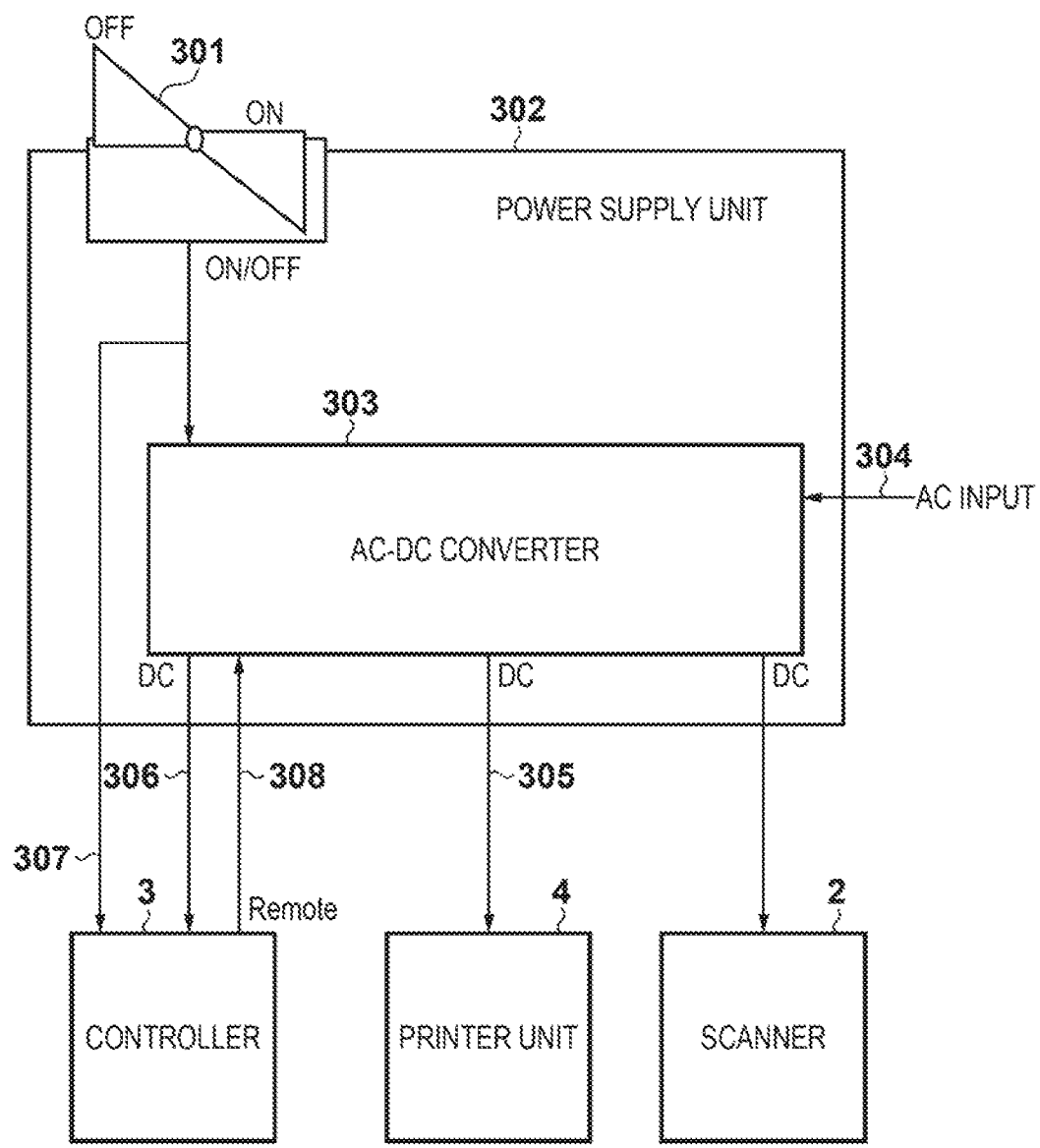
FIG. 3 is a diagram illustrating a configuration of a power supply and a power switch of an image forming apparatus.

FIG. 3 is a diagram illustrating a configuration of a power supply and a power switch in the image forming apparatus 1.

A toggle power switch 301 is used to turn on or off the power supply. A power supply unit 302 includes an AC-DC converter 303 that converts an AC voltage input from an AC power input unit 304 into a DC voltage. A power supply cable 305 supplies the DC voltage output from the AC-DC converter 303 to the printer unit 4. A power supply cable 306 supplies the DC voltage output from the AC-DC converter 303 to the controller 3. A signal line 307 notifies the controller 3 of a state of the power switch 301. A power control signal line 308 is a signal line for controlling the output of the AC-DC converter 303. The scanner 2 also operates in a similar manner by the DC voltage supplied from the AC-DC converter 303.

The operator is able to turn on or off the supply of power to the image forming apparatus 1 by operating the power switch 301. When the power switch 301 is turned on (in the state shown in FIG. 3), the controller 3 and the AC-DC converter 303 are connected to each other, in which state the controller 3 is capable of controlling the supply state of the power supply to each unit in the apparatus 1 via the power control signal line 308. When the power switch 301 is turned off, the supply of power to the controller 3 via the power supply cable 306 is continued until the controller 3 has completed shutdown of the apparatus 1. Thus, the controller 3 monitors the state of the power switch 301 via the signal line 307, and when the power switch 301 is turned off, performs shutdown processing. Then, after the shutdown processing has been completed, the controller 3 gives an instruction to stop the power supply to the controller 3 via the power supply cable 306, to the AC-DC converter 303 via the power control signal line 308.

The above has been a description of the common configuration of general information processing apparatuses that need to be shut down. The toggle power switch 301 is a switch that mechanically continues to hold one of two states, the on state and the off state. The operator causes the power switch 301 to hold either the on state or the off state by operating the power switch 301.

Note that although the toggle power switch that explicitly indicates either the on state or the off state is used in the present embodiment, there are a large number of information processing apparatuses such as personal computers that employ power supply switches that, unlike a toggle switch, do not have a state in which either the on state or the off state is held (including a power supply switch that itself functions as a power-saving transition switch). When such a switch that does not have the aforementioned state is turned on, if the power supply is connected, the switch functions as an "instruction to transition to the off or power saving state", and if the power supply is cut off, the switch functions as an "instruction to transition to the on state". Furthermore, continuously pressing the switch for a fixed time period or longer enables control such as inputting an "instruction to forcefully transition to the off state". Accordingly, the power switch is not limited to a toggle switch, and the present invention is also applicable to switches as described above that do not have the aforementioned on and off states.

Figure 4:
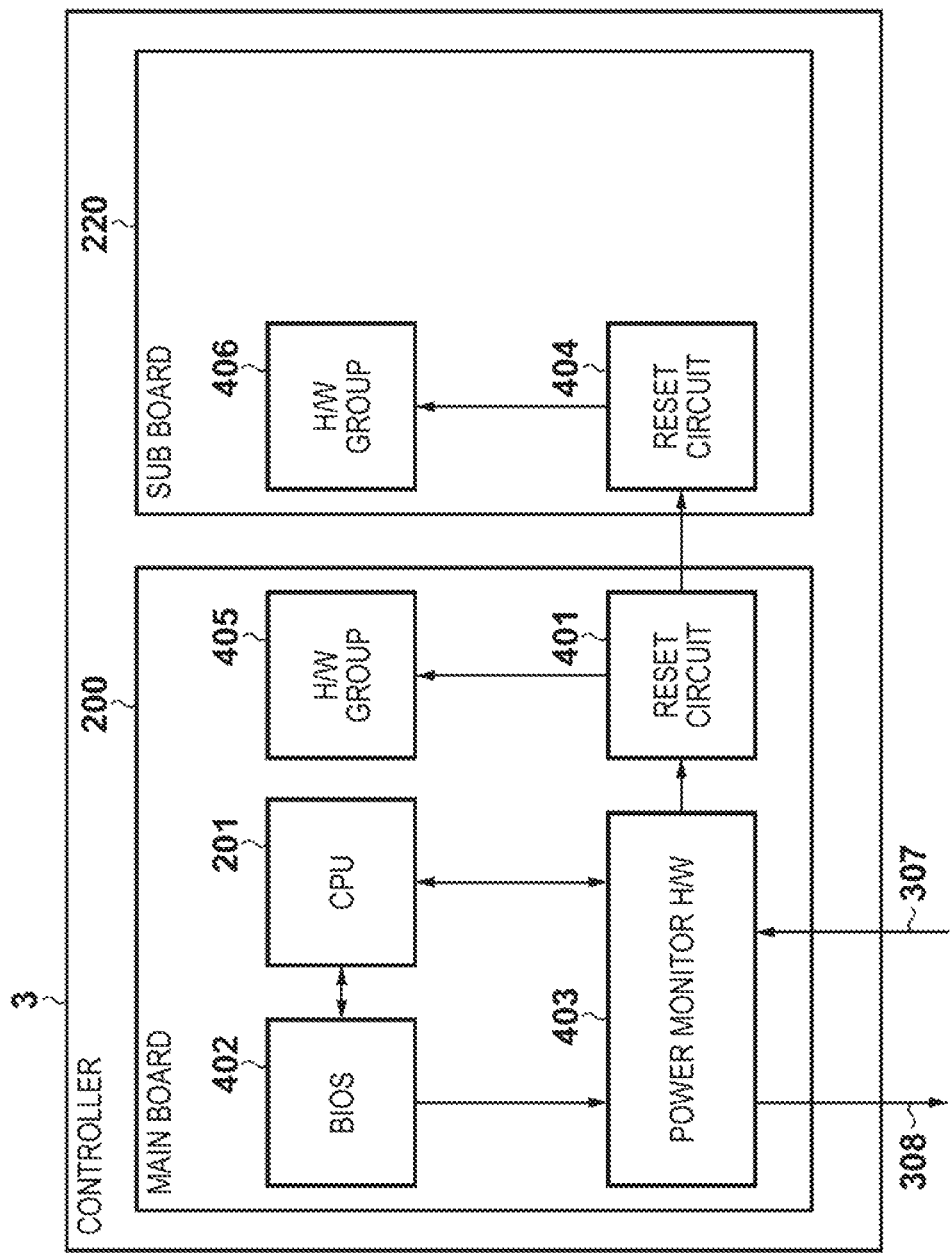
FIG. 4 is a block diagram showing a configuration of the controller for monitoring the power supply.

FIG. 4 is a block diagram showing a configuration of the controller 3 for monitoring the power supply according to the embodiment of the present invention.

A reset circuit 401 is provided on the main board 200. A BIOS 402 is used to control the basic portion of hardware (H/W) on the main board 200. Power monitor hardware 403 monitors power supply control of the apparatus 1, and in the case of using an application specific integrated circuit (ASIC) or the like, it may be a small-scale CPU system or the like. A reset circuit 404 is a reset circuit provided on the sub board 220. A hardware group 405 is a hardware group provided on the main board 200, and a hardware group 406 is a hardware group provided on the sub board 220.

Note that synchronizing hardware resets its internal state by resetting, and thus in a hardware circuit configured from such synchronizing hardware, a reset circuit needs to reset each piece of hardware after the power supply has been turned on and power has been supplied to each chip. In this case, since a plurality of hardware chips have a master and slave relationship, a reset sequence is designed and resetting is performed sequentially. For this reason, a single board generally includes a single reset circuit as in the present embodiment, and each reset circuit performs a reset operation within the board.

The main board 200 is, in particular, a primary board of the apparatus 1 and includes the power monitor hardware 403. The power monitor hardware 403 has the functions of, for example, controlling power supply on the main board 200 using the signal line 307 for inputting the state of the power switch 301, and the power control signal line 308.

Resetting can be performed in accordance with instructions from the CPU 201 in the case that the CPU 201 can operate normally. In a state in which power is not supplied to the CPU 201, the controller 3 can be powered on by controlling the power control signal line 308 in accordance with information from the signal line 307 for inputting the state of the power switch 301.

The BIOS 402 includes a low-level hardware control library or the like. In general, the BIOS 402 is provided to ensure the compatibility of an IBM compatible computer and is not an absolutely necessity in a so-called computer system. However, the BIOS 402 is illustrated in the present embodiment because it may be capable of implementing part of a power-saving function according to, for example, the ACPI specification.

The present embodiment describes an example in which a general ACPI-S3 mode (in which memory is resumed) is used as the power saving mode. The BIOS 402 is illustrated just as part of that function.

In the image forming apparatus 1 with the above-described hardware configuration, for example when the toggle power switch 301 has been turned off, the CPU 201 receives the state of the power switch 301 via the power monitor hardware 403. Normally, upon detecting that the power supply has been turned off, the CPU 201 executes shutdown processing and instructs the power monitor hardware 403 to shut down the apparatus 1. As a result, a notification indicating that the power supply has been turned off is given to the AC-DC converter 303 via the power control signal line 308, and the supply of DC power to the controller 3 via the power supply cable 306 is stopped, as a result of which the apparatus 1 is completely shut down. According to this shutdown, the execution of programs performed by the CPU 201 also ends completely. Then, when the power switch 301 has been turned on the next time, the execution of programs by the CPU 201 is normally launched.

The objective of the present embodiment is to increase the launch speed of the apparatus 1. As a general example of currently available techniques for increasing the launch speed, there is a technique for increasing the launch speed using the ACPI-S3 suspend mode. The following describes the case where this ACPI-S3 mode is applied to the apparatus of the present invention.

When an operator has turned the power switch 301 off, this fact is notified to the power monitor hardware 403 via the signal line 307. At this time, the CPU 201 detects by means of an interrupt that the power switch 301 has been turned off. Then, by for example invoking a power-saving interface of the kernel, the CPU 201 ultimately transitions to the ACPI-S3 mode, which is the function provided by the BIOS 402 and the power monitor hardware 403. The power supply unit 302 can be caused to transition to the ACPI-S3 power saving state (a state in which the conduction of power to only the memory and some pieces of the hardware is continued) by the power control signal line 308.

In this case, the apparatus 1 itself is not in the off state but in a "suspend state" in which the state of programs is held in the memory, in which case the controller 3 can be launched at high speed in a time period corresponding to reversion processing in the ACPI-S3 mode. However, if a power-saving mode such as the ACPI-S3 mode based on memory resume processing is employed, the hardware groups 405 and 406 on the boards to be reset by the reset circuit 401 or 404 are reset by the operation of turning on or off the power switch 301. However, such reset control is not performed on the software running on the CPU 201.

Problems caused by not resetting software for a long time are generally known, and ideally, it is preferable for control software running on the CPU 201 to be reset as well. However, if the control software running on the CPU 201 has been reset, the launch time at the time of the next launch increases, and a boot-up time necessary until the apparatus 1 has become operable by a user increases.

The following describes a technique for resolving the above-described problem according to the embodiment of the present invention.

Figure 5:
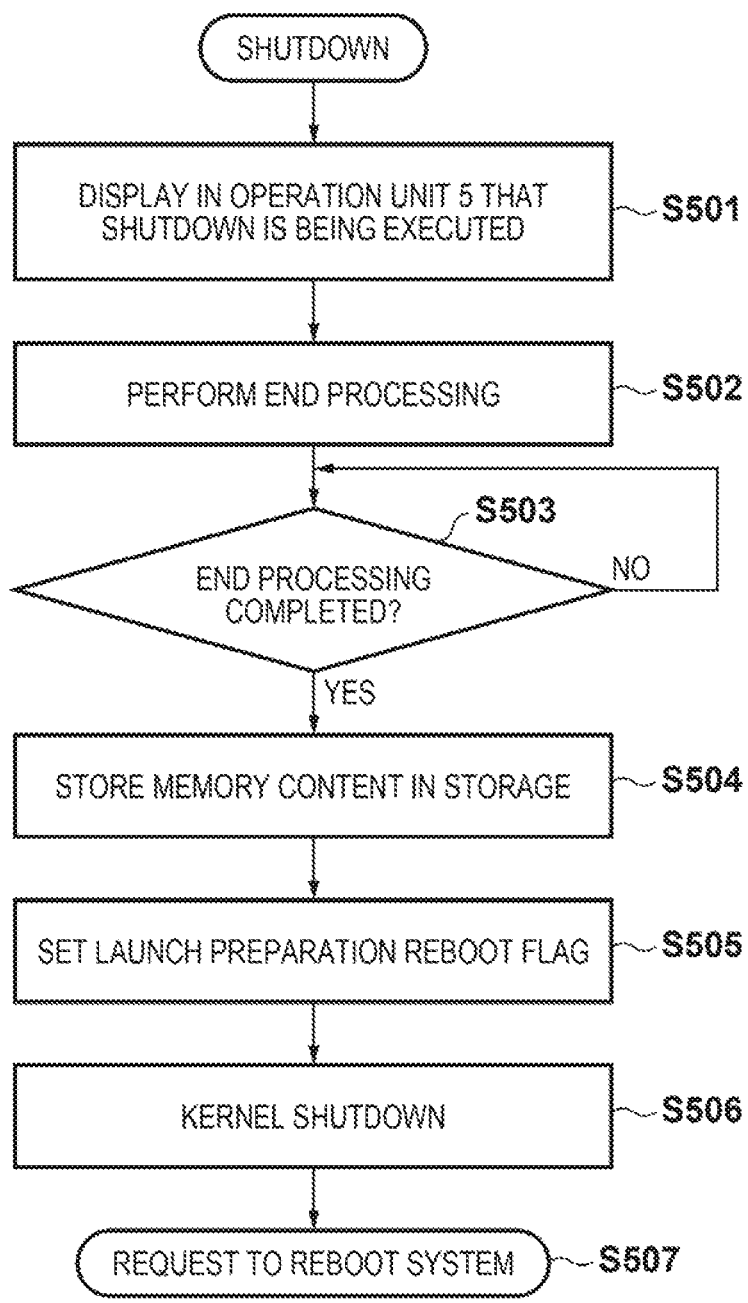
FIG. 5 is a flowchart for describing shutdown processing performed by the image forming apparatus according to the embodiment of the present invention.

FIG. 5 is a flowchart for describing shutdown processing performed by the CPU 201 of the image forming apparatus 1 according to the embodiment of the present invention. The shutdown processing is an operation for ending processing when an operator has turned off the power supply of the image forming apparatus 1. Note that a program for executing this processing is stored in the memory 203 and realized by the CPU 201 reading out and executing that program.

This processing is started when the CPU 201 has detected that an operator had turned the power switch 301 off, via the signal line 307. First, in step S501, a screen indicating that the apparatus 1 is being shut down is displayed in the operation unit 5. Next, the procedure proceeds to step S502, in which end processing for interrupting or ending services or the like that are currently being executed is performed. This end processing is executed by a plurality of processes in parallel, so the completion of all the processes in the end processing is waited for in step S503. If the completion of the end processing has been detected in step S503, the procedure proceeds to step S504, in which data in the memory 203 is stored in the HDD 6. For example, processing such as synchronizing the content of a storage buffer cached in the DRAM with the content of the HDD 6 is performed.

Next, the procedure proceeds to step S505, in which a launch preparation reboot flag (preparation flag) is set. Here, the CPU 201 sets the launch preparation reboot flag in some sort of register that can be accessed by the CPU 201 and whose state is not reset by the resetting of the hardware. In the present embodiment, since the power monitor hardware 403 exists at a higher level of the reset circuit 401, this launch preparation reboot flag is set in the register of the power monitor hardware 403.

Next, the procedure proceeds to step S506, in which the CPU 201 invokes a shutdown I/F of the kernel and performs final end processing for ending software in the kernel. Thereafter, the procedure proceeds to step S507, in which the CPU 201 issues a request to reboot (restart) the system, to the power monitor hardware 403.

The power monitor hardware 403 requests the reset circuit 401 to reset the entire apparatus, and the reset circuit 401 notifies the reset circuit 404 on the sub board 220 of this fact. As a result, a reset request is issued to the entire board 200. Since this reset request is a reboot request, the CPU 201 is reset as well, and as a result of exception issuance of the reset request, the CPU 201 performs, for example, boot processing based on the BIOS 402. In other words, regardless of the shutdown processing, the apparatus 1 is rebooted instead of being powered down. Accordingly, this shutdown sequence leads to a boot sequence in FIG. 6.

Figure 6:
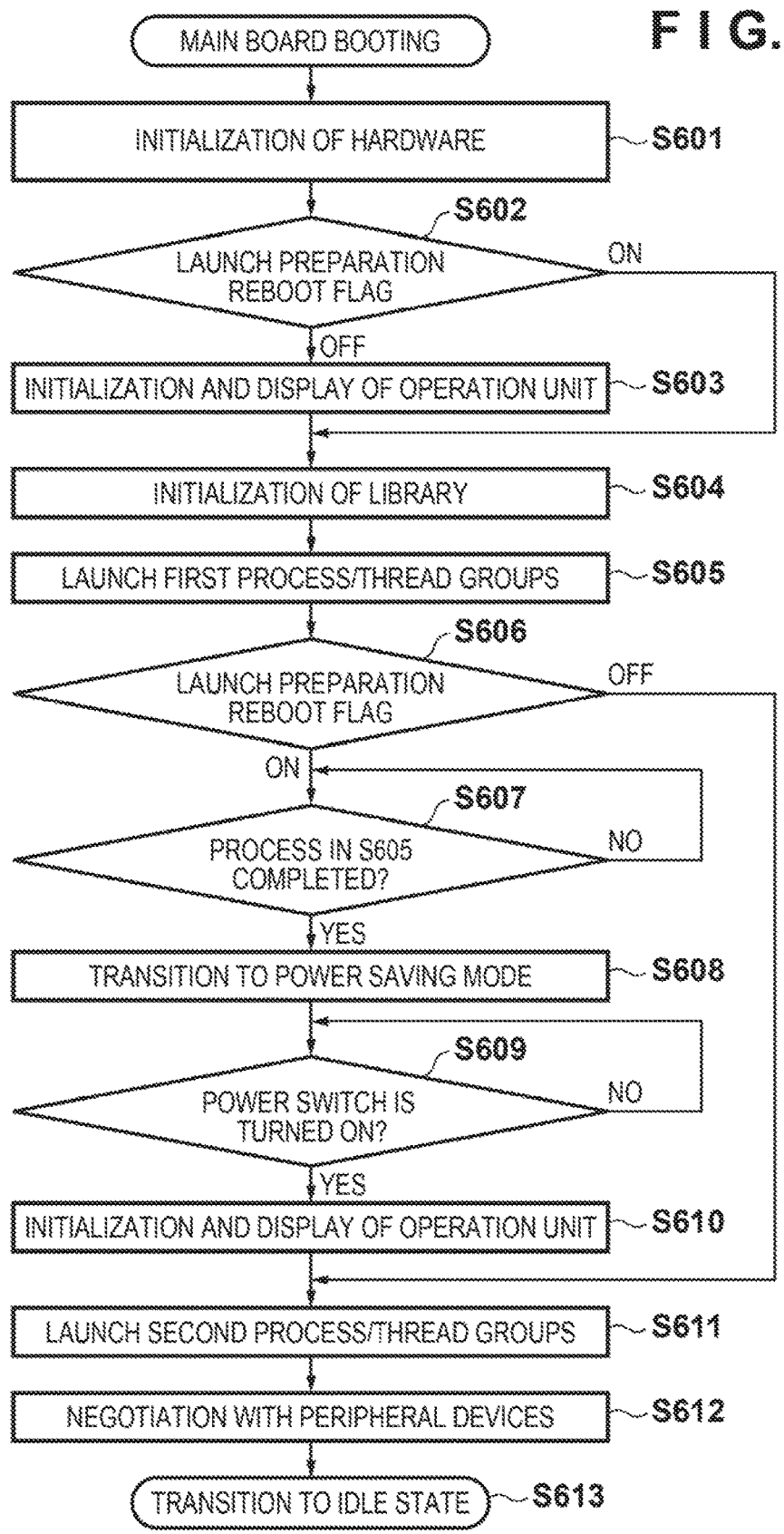
FIG. 6 is a flowchart for describing a boot sequence performed by the image forming apparatus according to the embodiment of the present invention.

FIG. 6 is a flowchart for describing a boot sequence performed by the image forming apparatus 1 according to the embodiment of the present invention. Note that a program for executing this processing is stored in the memory 203 and is realized by the CPU 201 reading out and executing that program. Although this boot method is launched by the system in multiple stages, this is a very difficult part, and thus the concept of processing performed by the CPU 201 is illustrated in the form of a flowchart and described.

First, hardware is initialized in step S601. The initialization of the hardware involves initialization of registers and interrupts, registration of corresponding device drivers in the kernel launch portion, and the like.

Next, the procedure proceeds to step S602, which is the feature of the present embodiment, in which it is determined whether or not the current launch is a boot for preparation for high-speed launch. Specifically, it is determined whether or not the launch preparation reboot flag that has been set in step S505 in FIG. 5 is on, and if the flag is on, the procedure skips a process of step S603 and proceeds to step S604. In step S603, initialization and display of the operation unit 5 are performed. Here, since this is the initial display, a message such as "Launching the apparatus" is displayed. In other words, if the launch preparation reboot flag is on, the initialization is continued in a state in which no message is displayed in the operation unit 5.

Next, the procedure proceeds to step S604, in which initialization of software layers is started. Here, an initialization routine of each library is invoked, and then in step S605, first process/thread groups are launched. Mainly, pure software services or the like that do not affect peripheral hardware are appropriate to be launched at this time. The reason for this will be described later. Next, the procedure proceeds to step S606, in which it is determined whether the launch preparation reboot flag, which has also been referred to in step S602, is on or off. If the flag is off, the current launch is normal launch, and therefore the procedure proceeds to step S611. On the other hand, if the flag is on, the current boot is a launch for preparation for subsequent launch, so the procedure proceeds to step S607, in which the completion of the process of step S605 is waited for. Alternatively, asynchronous control such as waiting may be performed.

In the case where the launch preparation reboot flag is on and this launch processing is being executed, no message is displayed in the operation unit 5. Then, when the process of step S605 has been completed, the procedure proceeds to step S608, regardless of being in the middle of the launch, and the apparatus 1 transitions to the power saving mode. This power saving mode is preferably a mode that enables high-speed reversion. In general, using the ACPI-S4 hibernation mode or the ACPI-S3 suspend mode is the mainstream, and it is assumed here that the apparatus 1 transitions to the ACPI-S3 state that is superior in speed. Note that since the method for transition to the ACPI-S3 mode has been described previously, the description thereof has been omitted here. In this state, the launch is suspended, the supply of power is limited to only the memory 203 and the power monitor hardware 403 on the main board 200, and the launch of the hardware system enters a standby state.

In this way, one characteristic sequence of the present embodiment is that the apparatus 1 is rebooted at the time of shutdown, instead of being powered down after shutdown, and the apparatus enters the power saving state in the middle of rebooting without displaying any message in the operation unit 5 during rebooting. In this case, the operator will not feel it unnatural because it seems to the operator that the shutdown processing is being continued for a longer time than usual, instead of it seeming that the apparatus 1 is being rebooted.

When using the apparatus 1 the next time, the operator turns the power switch 301 on in step S609. As a result, the power monitor hardware 403 detects that the power supply has been turned on, via the signal line 307. Then, the power monitor hardware 403 notifies the power supply unit 302 of an "instruction to turn on the entire apparatus in response to the turning-on of the switch", via the power control signal line 308. Then, the power supply unit 302 supplies power in response to power-on to the entire apparatus 1. Specifically, the power supply unit 302 supplies DC power to the controller 3, the printer unit 4, and the scanner 2. In response to this, CPUs of the printer unit 4 and the scanner 2 start initialization operations.

When the controller 3 is in the suspend state, the procedure comes out of the process of step S609 in FIG. 6 and proceeds to step S610, in which initialization and display of the operation unit 5 are performed. As a result, the apparatus 1 enters a state in which a message such as "Launching the apparatus" is displayed. Next, the procedure proceeds to step S611, in which second process/thread groups are launched. These programs are mainly for enabling communication with peripheral devices such as the printer unit 4 and the scanner 2 for launch, and these programs launched here are only programs that are inappropriate to launch prior to entering the ACPI-S3 suspend power saving state in step S605. The procedure then proceeds to step S612, in which communication is established by conducting negotiations with the printer unit 4 and the scanner 2. Thereafter, the procedure proceeds to step S613, in which the apparatus 1 transitions to the idle state.

As described above, according to the present embodiment, the processes of steps S601 to S605 can be omitted at the time of the aforementioned launch from the power saving state, and therefore the launch speed of the apparatus can be increased by the amount of time corresponding to the omitted processes.

Figure 7:
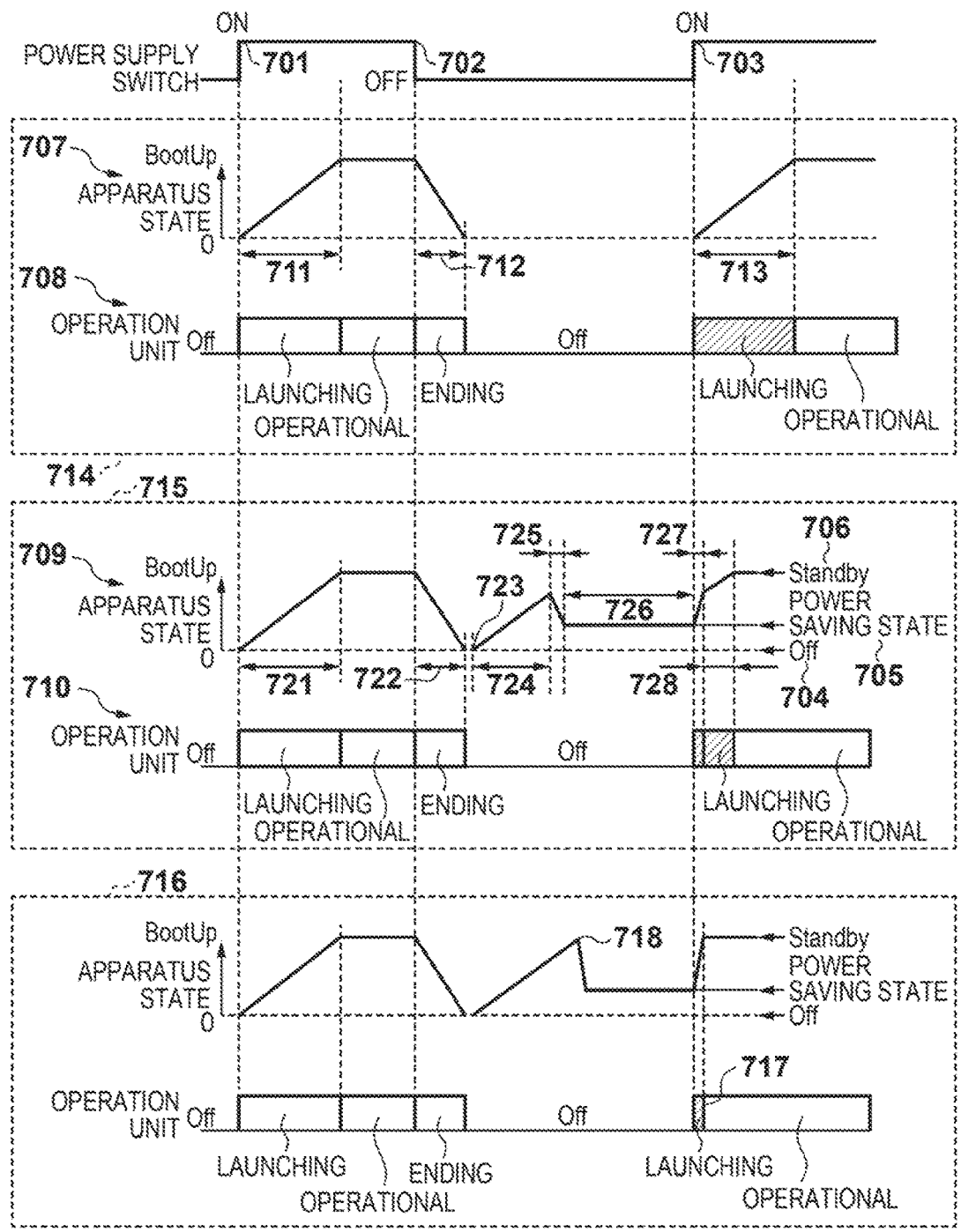
FIG. 7 is a diagram for explaining a launch sequence and a change in the power state with time according to the embodiment of the present invention.

The display state of the operation unit 5, the launch sequence of the apparatus itself, and a change in the power state with time when such a flowchart is applied to a product are shown in FIG. 7.

FIG. 7 is a diagram for explaining a launch sequence and a change in the power state with time according to the embodiment of the present invention. Note that in FIG. 7, the horizontal axis indicates time. In the present example, the power switch 301 is turned on at time 701, turned off at time 702, and turned on again at time 703. Conventional operations performed in this case are indicated by 707 and 708, and a sequence performed when the present embodiment is applied is indicated by 709 and 710.

First is a description of a conventional line diagram 707 in a section 714. Here, the vertical axis indicates a boot condition in which the point 0 on the Y axis indicates that the power supply is off, and the point described as "BootUp" indicates where a boot is completed. After the power supply has been turned on at time 701, the apparatus is launched in a time period indicated by 711. During this time, a message indicating that the apparatus is being launched is displayed in the operation unit 5 as indicated by 708. Then, the apparatus enters an operational state, and when the power supply has been turned off at time 702, shutdown processing is performed in a time period 712. When the shutdown processing has been completed, the power supply enters the off state, and the display of the operation unit 5 is turned off as well. Then, when the power supply has been turned on the next time at time 703, launch processing 713 similar to that performed in the time period 711 is performed again. In this way, there is no difference between the processing performed when the power supply has been turned on in the time periods 711 and 713, and the apparatus is launched in appropriately the same amount of time. This is the general processing performed from launch to shutdown.

Next is a description of a line diagram 709 in a section 715 according to the present embodiment.

Reference numeral 721 indicates normal launch similar to that performed in the time period 711. When the power switch 301 has been turned off at time 702 in a state in which the normal launch has been completed, the shutdown processing shown in FIG. 5 is executed in a time period 722. Reference numeral 723 indicates a delay that has occurred as a result of issuance of a system reboot request in step S507 in FIG. 5. Thereafter, the boot processing shown in FIG. 6 is executed. Reference numeral 724 corresponds to the execution time of the sequence from steps S601 to S607 in FIG. 6. In the case of launch according to the present embodiment, the process of step S603 is skipped, so the initialization and display of the operation unit 5 is not performed. Thus, in the time period indicated by 724, launch can be performed in a state in which there is no message displayed in the operation unit 5.

Reference numeral 725 corresponds to the process of step S608, in which the apparatus 1 transitions to the power saving mode (in the present embodiment, the ACPI-S3 state). Normally, the transition time is not so long. Reference numeral 726 indicates a time period in which turning-on of the power switch 301 is waited for in a state in which the above transition has been completed, this time period corresponding to the process of step S609. Then, when the power switch 301 has been turned on at time 703, the apparatus 1 reverts from the power saving state in a time period indicated by 727, and initialization and display of the operation unit 5 are executed in step S610. As a result, a message such as "Launching the apparatus" is displayed during a time period indicated by 728, as shown with diagonal lines. During this period 728, the launch is continued for the amount of time taken to complete the processes of steps S611 and S612, and thereafter the apparatus 1 enters the operational state in step S613. Note that in FIG. 7, reference numeral 706 indicates the standby state, reference numeral 705 indicates the power saving state, and reference numeral 704 indicates the power off state. Reference numeral 710 indicates the display state of the operation unit 5 corresponding to the state of the apparatus itself indicated by 709.

In this way, the launch time can be shortened, as indicated by 728, by performing the processing for preparing for the next launch when the operator has turned the power switch 301 off at time 702. Furthermore, when the launch preparation reboot flag is on, by not displaying any message in the operation unit 5 during the time period indicated by 724, this time period becomes equivalent to the state in which the shutdown state is being continued, as viewed from outside. Thus, high-speed launch can be realized without the operator having any particular unnatural feeling.

Note that, when the display state of the operation unit 5 indicated by 710 is the off state, the power supply of a display unit of the operation unit 5 may be turned off or may be brought into a state that is equivalent to the off state such as where the backlight is turned off or where pure black is displayed. Even in such cases, similar effects can be achieved.

Furthermore, in the case where no special attention is given to the appearance or in the case of using an apparatus that does not include the operation unit 5, a method may be employed in which no special operation is performed on the operation unit indicated by 710. Although not shown, even with this method, it is possible to shorten the launch time. In this case, after the power switch 301 has been turned off, a message such as "Shutting down the apparatus" is displayed in the operation unit 5 during shutdown, and thereafter at the time of rebooting, a message such as "Launching the apparatus" is displayed as in the case of normal launch. The following sequence is such that the display of the operation unit 5 is turned off and the turning-on of the power switch 301 at time 703 is waited for. Accordingly, if the launch time of an apparatus is originally not so long, the operator will not have unnatural feeling even if such a method is employed.

Furthermore, a case can also be considered in which the processes of steps S611 and S612 are not necessary in the boot processing shown in FIG. 6. In that case, the point in time when the process of the step S607 ends corresponds to the completion of launch, and the point in time indicated by 718 in FIG. 7 corresponds to the completion of launch as in step S613. In the present embodiment, the apparatus enters the power saving mode after the completion of launch, instead of in the middle of launch, so the sequence is as indicated by 716 in FIG. 7. In this case, the time taken to revert from the power saving state, which is indicated by 717, corresponds to the amount of time elapsed until the apparatus has entered an operational state.

When applying the method indicated by 716 in FIG. 7 according to the present embodiment, if an apparatus has a power-saving launch function, the time at which the apparatus transitions from the operational state to the power saving state, which is indicated by 718, is defined in advance. Normally, when the apparatus has a power saving function based on a timer, the apparatus will automatically transition to the power saving mode after a fixed time period has elapsed since restart. Accordingly, even if the present embodiment is not applied, the apparatus will automatically transition to the power saving mode by simply leaving the apparatus after restart for a predetermined time period without operations. However, a feature of the present embodiment is that the apparatus voluntarily transitions to the power saving state in a shorter time than the above-described time period of transition to the power saving state, and ideally, as soon as possible after the apparatus has entered an operational state at time 718. This allows the power consumption of the apparatus to be minimized.

Now, embodiments of the present invention will be described based on the above-described configuration.

First, a difference between "reversion from sleep" and "quick launch" will be described. In the case of sleep processing, there are a plurality of triggers for reversion from the power off state, such as a seesaw switch, a network, a FAX incoming call/off-hook, the RTC 210 (e.g., a timer or an alarm), and USB insertion/removal. On the other hand, the quick launch differs from the sleeping processing in that only a seesaw switch can be a trigger, and other triggers for reversion cannot be accepted. As viewed from the user, the off state of the power switch and "quick off" mean the same thing.

Details of the embodiments will be described below.

First Embodiment

Figure 8:
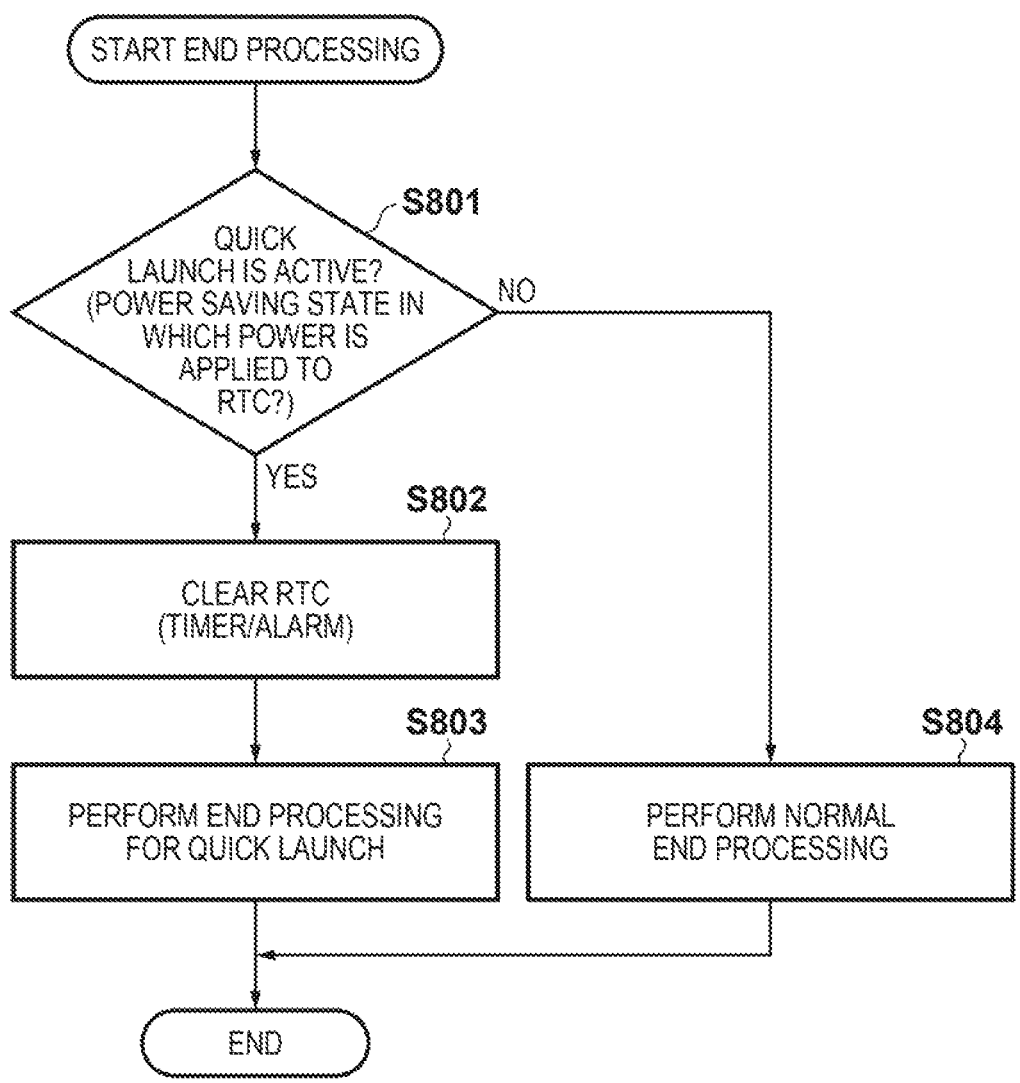
FIG. 8 is a flowchart for describing end processing according to a first embodiment.

Processing shown in the flowchart in FIG. 8 is performed when performing the end processing of step S502 in FIG. 5.

FIG. 8 is a flowchart for describing end processing according to a first embodiment. Note that a program for executing this processing is stored in the memory 203 and realized by the CPU 201 reading out and executing that program.

In step S801, it is determined whether or not the quick launch is active, and if the quick launch is inactive, the procedure proceeds to step S804, in which normal end processing is executed. On the other hand, if the quick launch is active in step S801, the procedure proceeds to step S802, in which the RTC 210 is cleared and thereafter the procedure proceeds to step S803, in which end processing for quick launch is performed.

Furthermore, as described previously, the process of step S802 may involve the following instead of cancelling the setting of the RTC 210. Specifically, a situation in which RTC interrupts will not occur may be created using a method such as masking interrupts from the RTC 210, setting hardware such that the RTC 120 is disabled, or stopping the clock of the RTC 210.

With the first embodiment, it is possible to prevent the apparatus from reverting due to interrupts from the RTC 210 during quick off.

Second Embodiment

Processing shown in the flowchart in FIG. 9A is performed when performing the end processing of step S502 in FIG. 5.

FIG. 9A is a flowchart for describing end processing according to a second embodiment.

In step S901, it is determined whether or not the quick launch is active, and if it has been determined that the quick launch is inactive, the procedure proceeds to step S905, in which normal end processing is performed. On the other hand, if it has been determined in step S901 that the quick launch is active, the procedure proceeds to step S902, in which a setting value in the RTC is saved. Then, the procedure proceeds to step S903, in which the RTC 210 is cleared, and thereafter end processing for quick launch is performed in step S904.

Furthermore, in step S611 in FIG. 6, processing shown in the flowchart in FIG. 9B is performed in the process for launching the second process/thread group.

FIG. 9B is a flowchart for describing quick launch processing according to the second embodiment.

In FIG. 9B, processing for starting the quick launch is performed in step S910. Next, the procedure proceeds to step S911, in which it is determined whether or not the setting value in the RTC has been saved, and if the setting value has been saved, the procedure proceeds to step S912, in which the RTC (e.g., a timer or an alarm) is set again using the saved setting value. If the setting value has not been saved, the processing ends.

According to the second embodiment, the application can know whether or not there is an RTC interrupt during quick off, at the time of the quick launch.

Third Embodiment

Figure 10:
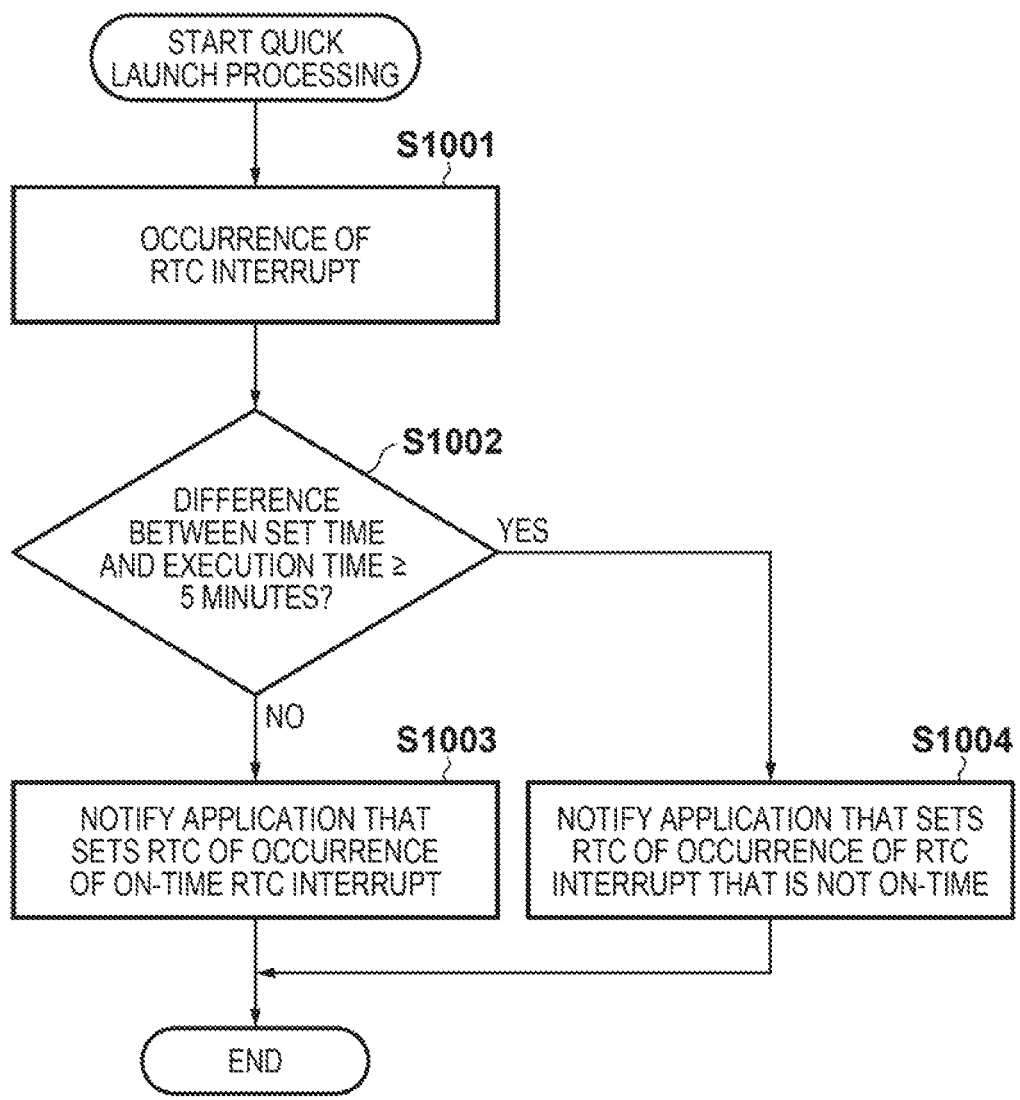
FIG. 10 is a flowchart for describing quick launch processing according to a third embodiment.

FIG. 10 is a flowchart for describing quick launch processing according to a third embodiment. This processing is executed after the processing shown in the flowchart in FIG. 9B.

In step S1001, if an RTC interrupt has occurred, the procedure proceeds to step S1002, in which it is determined whether or not a difference between the set time and the execution time of the RTC interrupt is greater than or equal to a fixed time period (e.g., 5 minutes or longer). If it has been determined that the difference is greater than or equal to the fixed time period, the procedure proceeds to step S1004, in which the application that has set the RTC 210 is notified of the occurrence of an RTC interrupt that is not on time, that is, the occurrence of an RTC interrupt that has been set during the quick-off period. On the other hand, if the set time and the execution time are substantially the same in step S1002, the procedure proceeds to step S1003, in which the application that has set the RTC 210 is notified of the occurrence of an on-time interrupt, that is, the occurrence of an RTC interrupt that has been set during a period other than the quick-off period.

Note that the reason why the set time and the execution time have a range of difference therebetween instead of being exactly the same is that a case is considered in which the precision of the RTC 210 is in minutes or in which, when reversion from the sleep state has occurred due to an RTC interrupt, the reversion time of several tens of seconds is necessary until a response to the interrupt has been transmitted to the application. In other words, the response cannot always be transmitted on the designated time.

According to the third embodiment, the application can know whether the current interrupt is an RTC interrupt generated during quick off or an on-time RTC interrupt, from information obtained at the time of occurrence of the RTC interrupt. Accordingly, it is possible to stop processing that does not need to be performed if the execution time is not on time, for example, such as the case of distributions at designated times.

Fourth Embodiment

Figure 11:
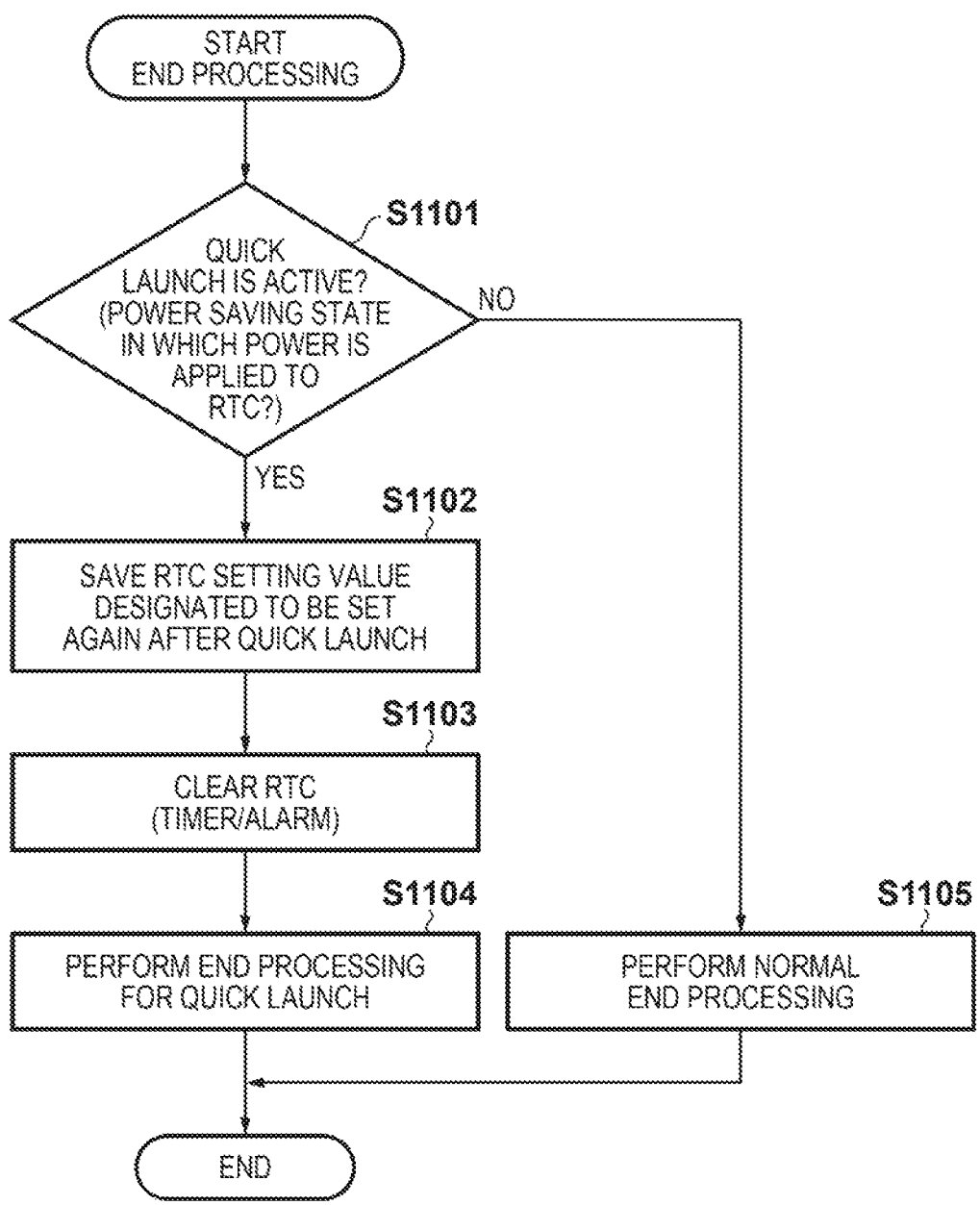
FIG. 11 is a flowchart for describing end processing according to a fourth embodiment.

FIG. 11 is a flowchart for describing end processing according to a fourth embodiment. This processing is executed in the end processing performed in step S502 in FIG. 5.

First, it is determined in step S1101 whether or not the quick launch is active, and if the quick launch is inactive, the procedure proceeds to step S1105, in which normal end processing is executed. On the other hand, if it has been determined in step S1101 that the quick launch is active, the procedure proceeds to step S1102, in which an RTC setting value that is designated to be set again in the RTC 210 after the quick launch is saved. Then, the procedure proceeds to step S1103, in which the RTC 210 is cleared, and thereafter end processing for quick launch is performed in step S1104.

Note that the quick launch processing in the fourth embodiment is the same as that shown in FIG. 9B.

The processing shown in FIG. 9B is performed when the process for launching the second process/thread group is performed in step S611 in FIG. 6. Specifically, processing for starting the quick launch is performed in step S910, and then if it has been determined in step S911 that the RTC setting value has been saved, the RTC 210 is set again using the saved setting value in step S912.

In the above-described case, if the RTC 210 is designated to be set again, the setting value in the RTC 210 is saved during end processing. However, if the RTC 210 is designated to be set again, it is also possible to restore the setting value in the RTC 210 during launch processing.

According to the fourth embodiment, it is possible to reduce the number of RTC interrupts occurring simultaneously at the time of quick launch.

Fifth Embodiment

FIG. 12A is a flowchart for describing end processing according to a fifth embodiment. This processing is performed in the end processing of step S502 in FIG. 5.

First, it is determined in step S1201 whether or not the quick launch is active, and if the quick launch is inactive, the procedure proceeds to step S1205, in which normal end processing is performed. On the other hand, if it has been determined in step S1201 that the quick launch is active, the procedure proceeds to step S1202, in which an application is notified of the fact. As a result, the application clears the RTC (timer/alarm) in step S1203 and performs end processing for quick launch in step S1204.

FIG. 12B is a flowchart for describing quick launch processing according to the fifth embodiment. This processing is performed in the process for launching the second process/thread group in step S611 in FIG. 6.

First, processing for starting the quick launch is performed in step S1211. Next, the procedure proceeds to step S1212, in which the application is notified of the fact that the quick launch has occurred. In step S1213, the application resets the RTC (timer/alarm).

According to the fifth embodiment, in the case where RTC interrupts during quick off are unnecessary, it is possible to prevent RTC interrupts themselves from occurring at the time of quick launch.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-115144, filed May 23, 2011, which is hereby incorporated by reference herein in its entirety.

What is claimed is:

1. A printing apparatus comprising:
a memory;
a processor configured to execute data processing using the memory:
a printing unit configured to print an image on a sheet;
a power switch operable by a user;
interrupting circuitry that outputs an interrupt signal at a set time to shift the printing apparatus into a first power state in which power is supplied to the memory and the processor; and
power control circuitry configured to shift, in accordance with a turn-off of the power switch, the printing apparatus into a second power state in which power is not supplied to the memory, the processor, and the printing unit or a third power state in which power is supplied to the memory and the interrupting circuitry and power is not supplied to the processor and the printing unit,
wherein the processor is further configured to control, in a case where the power control circuitry shifts the printing apparatus into the third power state in accordance with the turn-off of the power switch, the interrupting circuitry not to output the interrupt signal in the third power state.

2. The printing apparatus according to claim 1, wherein the processor is further configured to control to clear the time set to the interrupting circuitry, in a case where the power control circuitry shifts the printing apparatus into the third power state in accordance with the turn-off of the power switch.

3. The printing apparatus according to claim 2, wherein the processor is further configured to save information indicating the time set to the interrupting circuitry before the processor clears the time set to the interrupting circuitry.

4. The printing apparatus according to claim 3, wherein the processor is further configured to save information related to a time to be set again to the interrupting circuitry.

5. The printing apparatus according to claim 3, wherein the processor is further configured to set a time to the interrupting circuitry based on the saved information upon the printing apparatus having returned from the third power state.

6. The printing apparatus according to claim 5, wherein the processor is further configured to set information related to a time to be set again to the interrupting circuitry.

7. The printing apparatus according to claim 5, wherein the interrupting circuitry outputs the interrupt signal in accordance with the processor having set the time, in a case that the time set by the processor indicates a time before a current time.

8. The printing apparatus according to claim 7, wherein the processor is further configured to notify an application that sets a time to the interrupting circuitry of whether the interrupt signal is output based on the time set by the application or the interrupt signal is output based on a time being different from the time set by the application.

9. The printing apparatus according to claim 8, wherein the application determines whether or not to execute an interrupt operation in accordance with the interrupt signal based on a notification by the processor.

10. The printing apparatus according to claim 2, wherein the processor does not clear the time set to the interrupting circuitry, in a case where the power control circuitry shifts the printing apparatus into the second power state in accordance with the turn-off of the power switch.

11. The printing apparatus according to claim 1, wherein the interrupt signal is output from the interrupting circuitry when the printing apparatus is in a predetermined state different from the first, second, and third power states.

12. The printing apparatus according to claim 1, wherein the power control circuitry shifts the printing apparatus into the first power state in accordance with a turn-on of the power switch.

13. The printing apparatus according to claim 1, wherein the power switch is a toggle power switch capable of holding either an ON state or an OFF state.

14. The printing apparatus according to claim 1, wherein the third power state utilizes an S3 mode defined by ACPI (Advanced Configuration and Power Interface).

15. The printing apparatus according to claim 1, wherein the interrupting circuitry includes an RTC (Real Time Clock).

16. The printing apparatus according to claim 1, wherein power consumption in the third power state is less than in the first power state.

17. The printing apparatus according to claim 16, wherein power consumption in the third power state is more than in the second power state.

18. The printing apparatus according to claim 16, wherein launch time from the third power state is shorter than from the second power state.

19. The printing apparatus according to claim 1, wherein the power control circuitry, in accordance with the turn-off of the power switch, shifts the printing apparatus into the second power state or the third power state, based on a setting regarding whether or not to enable a quick launch.

20. The printing apparatus according to claim 19, wherein the memory in the third power state stores information used to launch the printing apparatus and the printing apparatus is launched from the third power state using the stored information, in a case where the setting indicates that the quick launch is enabled, and the printing apparatus is launched from the second power state in a case where the setting indicates that the quick launch is not enabled, and
wherein a launch time from the third power state is shorter than a launch time from the second power state.

21. The printing apparatus according to claim 1, wherein the power control circuitry shifts the printing apparatus into the first power state in accordance with a turn-on of the power switch.

22. The printing apparatus according to claim 1, wherein power is supplied to the printing unit in the first power state.

23. A method of controlling a printing apparatus having a processor, a memory used by the processor, printing unit for printing an image on a sheet and interrupting circuitry that outputs an interrupt signal at a set time, the method comprising:
receiving a print job for causing the printing unit to print;
supplying an electric power to the processor based on the interrupt signal; and
controlling the interrupting circuitry not to output the interrupt signal in a first power saving state in which an electric power is supplied to the memory and interrupting circuitry and is not supplied to the printing unit and in which the printing apparatus cannot receive data from an external apparatus.

24. The method according to claim 23, wherein in the controlling, the time set to the interrupting circuitry is cleared.

25. The method according to claim 24, further comprising saving information indicating the time set to the interrupting circuitry before the time set to the interrupting circuitry is cleared.

26. The method according to claim 25, further comprising setting a time to the interrupting circuitry again based on the saved information when the printing apparatus returns from the first power saving state.

27. The method according to claim 23, wherein the printing apparatus has a power switch operated by a user, a memory, and a processor which executes data processing using the memory, wherein the method further comprises:
shifting, in accordance with a turn-off of the power switch, the printing apparatus into a power off state or the first power saving state,
wherein electric power is not supplied to the memory, the processor, and the printing unit in the power off state, and electric power is supplied to the memory and the interrupting circuitry and is not supplied to the processor and the printing unit in the first power saving state.

28. The method according to claim 27, wherein electric power consumption in the first power saving state is more than in the power off state.

29. The method according to claim 27, wherein the memory in the first power saving state stores information used to launch the printing apparatus.

30. The method according to claim 29, wherein the printing apparatus is launched from the first power saving state using the stored information, in a case where a setting indicates that a quick launch is enabled, and is launched from the power off state in a case where the setting indicates that the quick launch is not enabled.

31. The method according to claim 27, wherein the shifting shifts, in accordance with a turn-off of the power switch, the printing apparatus into the power off state or the first power saving state, based on a setting regarding whether or not a quick launch is enabled.

32. A printing apparatus comprising:
a power switch which receives a turn-off instruction from a user,
a printing unit configured to print an image on a sheet;
a controller including:
a memory;
a processor which executes data processing using the memory;
interrupting circuitry that outputs an interrupt signal at a set time to shift the printing apparatus into a first power state in which power is supplied to the memory and the processor; and
power control circuitry that controls power state of the printing apparatus, wherein the power control circuitry shifts, in accordance with the turn-off instruction via the power switch, the printing apparatus into a second power state in which power is not supplied to the memory, the processor, and the printing unit or a third power state in which power is supplied to the memory and the interrupting circuitry and power is not supplied to the processor and the printing unit, and
wherein the controller executes processing for preventing from shifting, in accordance with the interrupt signal output by the interrupting circuitry, from the third power state to the first power state.

33. The printing apparatus according to claim 32, wherein, in accordance with the turn-off instruction via the power switch, the controller executes the processing for preventing from shifting, in accordance with the interrupt signal output by the interrupting circuitry, from the third power state to the first power state.

34. The printing apparatus according to claim 32, wherein the memory stores information used to launch the printing apparatus in the third power state,
wherein the power control circuitry shifts, in accordance with the turn-off instruction via the power switch, the printing apparatus into the second power state or the third power state, based on a setting regarding whether or not a quick launch is enabled, and
wherein the printing apparatus is launched from the third power state using the information stored in the memory and launched from the second power state using a boot program stored in another memory different from the memory, in accordance with a turn-on instruction from the user, launch time from the third power state being shorter than from the second power state.

35. The printing apparatus according to claim 32, wherein power is supplied to the printing unit in the first power state.

36. The printing apparatus according to claim 31, wherein the processing for preventing from shifting, in accordance with the interrupt signal output by the interrupting circuitry, from the third power state to the first power state includes:
   a first processing for controlling the interrupting circuitry not to output the interrupt signal in the third power state, or
   a second processing for invalidating the interrupt signal output by the interrupting circuitry in the third power state.

37. The printing apparatus according to claim 36, wherein the first processing resets a setting of the interrupting circuitry for outputting the interrupt signal, or invalidates the interrupting circuitry, or stops supplying a clock signal to the interrupting circuitry.

* * * * *